United States Patent [19]

Krisna et al.

[11] Patent Number: 5,428,821
[45] Date of Patent: Jun. 27, 1995

[54] BASE SITE WITH REMOTE CALIBRATION CAPABILITY

[75] Inventors: Prathivadhi Krisna, Boynton Beach; Paul D. Marko, Ft. Lauderdale; Craig P. Wadin, Sunrise, all of Fla.

[73] Assignee: Motorola, Inc., Schaumburg, Ill.

[21] Appl. No.: 722,779

[22] Filed: Jun. 28, 1991

[51] Int. Cl.⁶ .......................... H04Q 7/30; H04Q 7/34
[52] U.S. Cl. ................................. 455/54.1; 455/67.4; 455/70; 379/63
[58] Field of Search ...................... 455/33.1, 33.2, 62, 455/68, 69, 70, 54.1, 56.1, 67.4, 88, 226.2; 340/825.54, 825.08; 342/42; 374/58, 59, 63

[56] References Cited

U.S. PATENT DOCUMENTS

| | | | |
|---|---|---|---|
| 3,913,017 | 10/1975 | Imaseki | 455/33.4 |
| 4,155,040 | 5/1979 | Harmon et al. | 455/88 |
| 4,435,840 | 3/1984 | Kojima et al. | 455/56.1 |
| 4,665,404 | 5/1987 | Christy et al. | 342/463 |
| 4,696,027 | 9/1987 | Bonta | 379/60 |
| 5,003,619 | 3/1991 | Morris et al. | 455/69 |
| 5,222,248 | 6/1993 | McDonald et al. | 455/33.2 |
| 5,276,906 | 1/1994 | Felix | 455/33.2 |
| 5,289,138 | 2/1994 | Schweindeman | 455/67.4 |

FOREIGN PATENT DOCUMENTS 2098427  11/1982  United Kingdom ............... 455/67.1

Primary Examiner—Edward F. Urban

[57] ABSTRACT

A base site (200) capable of being remotely calibrated includes a receiver (206) and transmitter (210). The base site (200) further includes a controller (208) for controlling the base site and for measuring a transmission parameter related to the received transmission message from handset (120). Once an update message is received from handset (120) controller (208) updates the operating parameter of the base site (200).

5 Claims, 3 Drawing Sheets

BASE SITE WITH REMOTE CALIBRATION CAPABILITY

TECHNICAL FIELD

This invention relates to communication systems and more specifically to radio tellephone communication systems.

BACKGROUND

Radio telephone communication systems (such as second generation cordless telephone, or Digital European Cordless Telephone) comprise a plurality of base sites (also known as telepoints) and a plurality of radio telephones (also known as handsets). Taking second generation cordless telephone (CT2) as an example, the users of CT2 radio telephones communicate with users of other radio telephones or subscribers in a public or private switched telephone network (PSTN) via the several base sites. A large number of base sites is desirable in certain areas (such as shopping malls) to eliminate gaps in coverage by the base site network and to provide sufficient communication capacity. However, these base sites are generally not networked with each other and operate substantially independently from each other.

When a radio telephone user wishes to place a call, he or she causes the radio telephone unit to transmit a channel request signal. Since each base site is monitoring the channels of the CT2 system independently, the base site that grants the channel request may not necessarily be the one physically closest to the radio telephone unit transmitting the channel request signal. That may be a communicatiion detriment because the user may establish a link under ,weak signal conditions that would result in poor quality audio communications. Moreover, the user may move out of range of the base site causing the communication link to be dropped. On the other hand, if the communication link establishment area is decreased, the base site granting system access to the telephone user would facilitate the maintenance of a quality communication link allowing the telephone user to move over a greater area.

As part of the base site installation procedure, the base site needs to be adjusted for its surroundings (receive sensitivity, antenna angle of base site, RSSI threshold level for link establishment, etc.), to assure quality radio communication links to the user. The prior art method of adjusting CT2 base sites has proven too slow and clumsy to be practical. The prior art method relied on the help of the central network controller operator to perform an interrogation of each of the base sites and then relay information back to a field engineer setting up the equipment, as the engineer was taking signal strength readings of the coverage area.

The goal of adjusting the base sites is to ensure that the user will communicate via the base site physically closest to him or her in order to have optimum communication links established. By establishing a communication link with the best site possible, the chances of having a superior signal quality communication link are increased.

Accordingly, a need exists for a base site and method to overcome the above problem.

SUMMARY OF THE INVENTION

The present invention provides an improved base site. The base site includes a receiver means for receiving a transmission message from a communication unit and a measurement means for measuring a transmission parameter related to the received transmission message. The base site further includes a transmitter means for transmitting information relating to the measured transmission parameter back to the communication unit and a controller means for adjusting an operating parameter of the base site after receiving an update message from the communication unit.

In another aspect of the present invention, a method of calibrating the base site includes the steps of: receiving a transmission message from a communication unit at the base site, the transmission message requesting a transmission parameter related to the received transmission message; measuring the transmission message in order to determine the transmission parameter; transmitting a response message back to the communication unit supplying the requested transmission parameter; receiving an update message from the communication unit requesting an update of the stored operating parameter; and finially updating the operating parameter.

DETAILED DESCRIPTION OF THE PREFERRED EMBODIMENT

Figure 1:
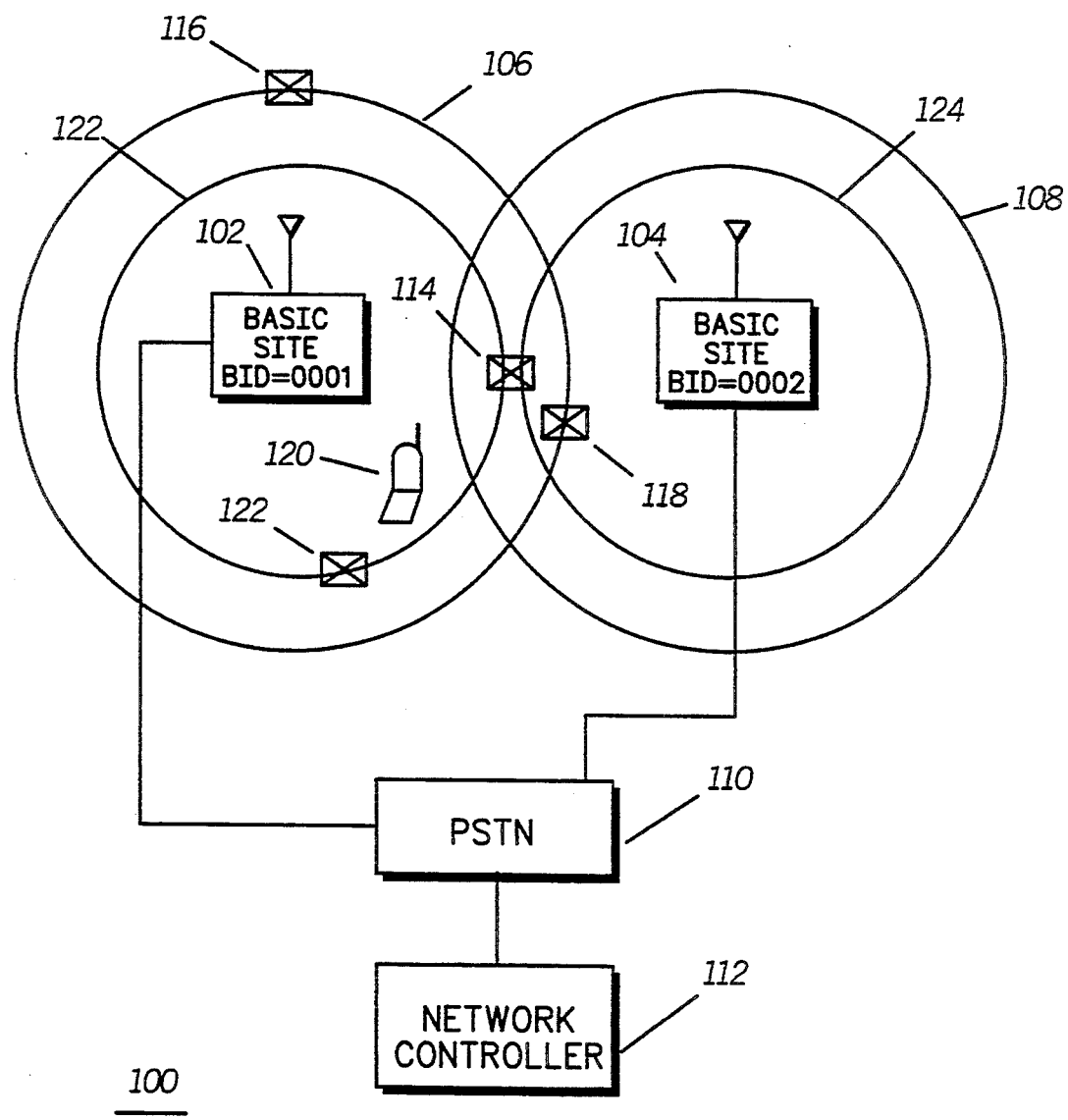
FIG. 1 is a simplified block diagram of a communication system in accordance with the invention.

Referring to FIG. 1, there is shown a simplified block diagram of a communication system 100 in accordance with the present invention. The communication system (preferably a second generation cordless telephone, or CT2, system) comprises at least one, base site (represented by base sites 102 and 104), and at least one portable communication unit 120 (which is preferably, a radio telephone handset). The base site 102 has a typical operating range represented by area 106, and base site 104 has an operating range represented by area 108. The preferred communication link establishment area for base site 102 is area 122 as shown in FIG. 1. Area 124 is the preferred communication link establishment area for base site 104. The preferred communication link establishment area is the area around base site (102 or 104) that an initial communication link with handset 120 should be established in. The areas of coverage (areas 106 and 108) and the desired communication link establishment areas (122 and 124) can vary in area from base station to base station. The size of the communication link establishment areas (122 and 124) will depend on the number of base sites located in the system, environmental factors such as buildings, etc. Both base site 102 and base site 104 are coupled to the Public Switched Telephone Network (PSTN, public telephone system) 110 or via any suitable wireless or wireline communication channel. Connected to the PSTN 110 is network control station 112 which is capable of communicating with each of the individual base :sites (102 and 104) such as by direct dialing over the PSTN 110 to the chosen base site (102 or 104)in the preferred embodiment.

Each of the base sites shown (base sites 102 and 104 in FIG. 1) have a unique base site identification number (BID) associated with them, for example base site 102 has BID "0001" while base site 104 has BID "0002".

During the installation or maintenance of system 100, each of the base sites (102 and 104) are required to be adjusted in order to provide the users of system 100 optimum operating performance. The end result of such adjustment is to erasure that the users of system 100 will communicate via the base site (102 or 104) physically closest to him or her in order to guarantee the best communication link possible at any given time.

Since in a typical CT2 system 100 each of the base sites (102 and 104) operate substantially independently from each other without a central coordinating controller, it is very important to adjust each of the base sites in order to guarantee best channel link up to each of communication device users. This is normally done by adjusting certain operating parameters which are stored in each of the base sites (102 and 104). For example, a typical base site will have a minimum receive signal strength criteria that will determine whether to accept a communication link request or not originating from a remote communication unit 120. This minimum signal strength criteria can differ based on, how many base stations are installed in the vicinity, location of the base site antennas, communication obstructions such as buildings, etc. The; higher the RSS (received signal strength) threshold level set at base 102, the smaller the resulting communication link establishment area 122. By optimally calibrating the minimum received signal strength (RSS) criteria in each of the base sites, a user has an increased chance of getting the best communication channel. Since RSS threshold level will dictate the size of the desired communication link establishment areas (areas 122 and 124) for each of the base sites (102 and 104), independent adjustment of the operating parameters of each of the base sites will optimize the desired link: establishment areas and will optimize; providing a handset user the best opportunity to get the best base site upon request of a communication link.

In order to facilitate the calibration of each of the base sites (sites 102 and 104) the present invention allows four the remote calibration of each of the base sites by way of using an unmodified communication unit (or CT2 handset) 120. After all of the base sites 102 and 104 have been installed, a field engineer simply has to take an unmodified handset 120 and press a few keypad entries in the handset 120 in order to interrogate each of the base sites and modify their individual operating parameters (RSS threshold level, bit error rate level, etc.).

For example, the field engineer can press a key sequence such as "Function key, # key, and then the number 1 key" in handset 120 to display the BID of the base site with which he is currently communicating. By pressing the sequence "Function key, # key, and then the number 2" he can display the received signal strength (RSS)of the transmission message sent by handset 120 during linkup, as measured at base site 102 (preferably in dBm as measured by base site 102). By moving around different locations shown as locations 114, 116, and 118 in coverage area 106, a field engineer can properly map the characteristics of base site 102.

According to the invention, the field engineer can also request any of the operating parameters stored in base site 102. For example by pressing the key sequence "Function key, # key, and then the number 4 key" the current minimum RSS threshold that is required to establish a communication link is display at handset 120. After characterizing the operating range of base site 102 the field engineer can send a command or instruction to base site 102 to modify its minimum RSS threshold. For example, this can be done by pressing the key sequence "Function key, # key, and then the number five key", followed by a two digit number representing the new threshold level to be stored at base site 102.

For security purposes such as to prevent unauthorized persons from using the calibration capabilities of the present invention, network controller 112 can enable or disable the calibration features on all the base sites (102 and 104). This can be accomplished by the network controller 112 "polling" each of the base sites (102 and 104) over the PSTN 16 in a known manner and sending a "disable calibration message" to each of them individually.

Figure 2:
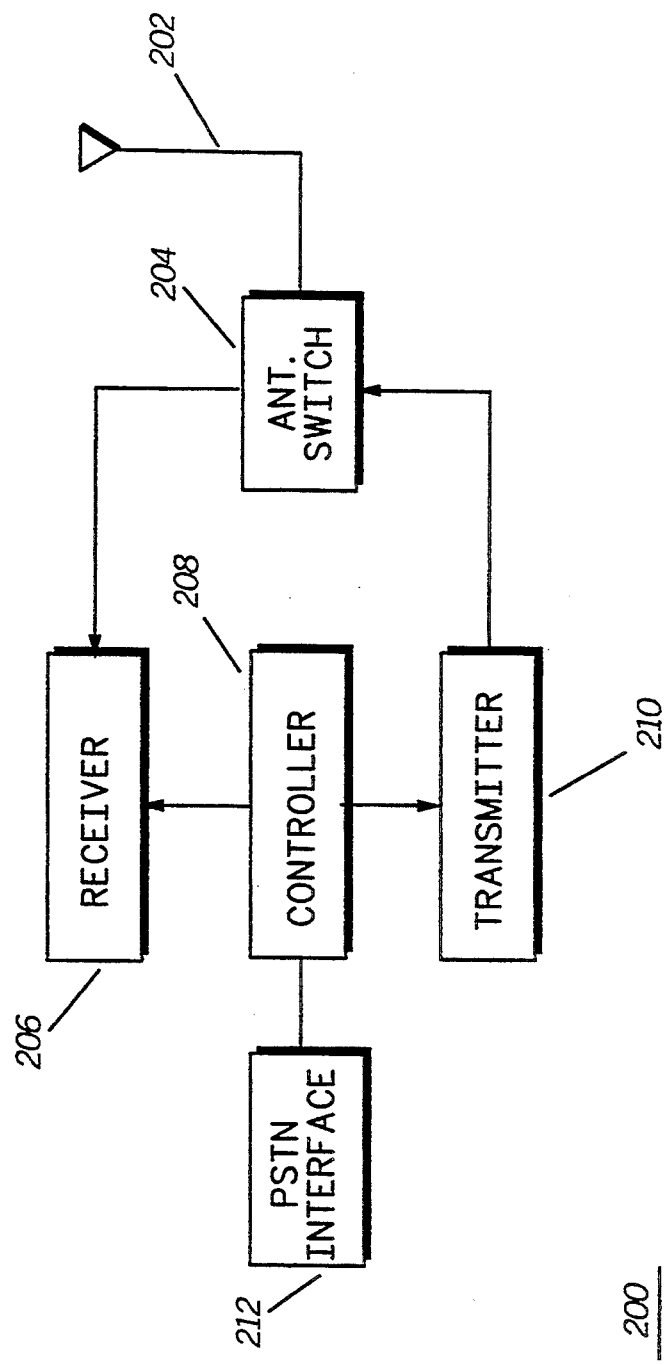
FIG. 2 is a simplified block diagram of a base site in accordance with the present invention.

Referring to FIG. 2, a public base site (or wireless phone booth, similar to base sites 102 and 104 shown in FIG. 1) 200, in accordance with the invention, is shown in block diagram form. The base site 200 comprises a receiver means such as a conventional receiver 206 and a transmitter means such as conventional transmitter 210. Both the transmitter 210 and receiver 206 are selectively coupled to antenna 202 via circulator or antenna switch (transmit/receive switch) 204 to allow for time-division multiplexing (TDM) to occur. TDM is the preferred method of transmission used in the CT2 system 100. Also included in base site 200 is a controller means, such as controller 208 that is a conventional microcontroller or microprocessor with associated memory, I/O lines, etc. as known in the art. The controller means 208 controls the overall operations of base site 200, including the operation of receiver 2.06 and transmitter 210. Coupled to controller 208 is PSTN interface circuit 21 2, which allows base site 200 to communicate over the PSTN 110 to the central network controller 112. Central controller 112 can communicate to base site 200 and interrogate it for information.

The receiver 206 in combination with the controller 208 act as a measurement means for measuring the received signal strength of the received messages originating at the handset 120. The receiver 206 will measure the signal strength of the incoming message and relay it to controller 208 where the data is processed using software algorithms stored in controller 208. The controller 208, depending on the request type, will transmit a return message back to handset 120 via transmitter 210. The return message will typically include the measured value of the transmission parameter requested as measured by receiver 206. In this particular example the transmission parameter is the RSS level of the transmission message as received by base 102.

Figure 3:
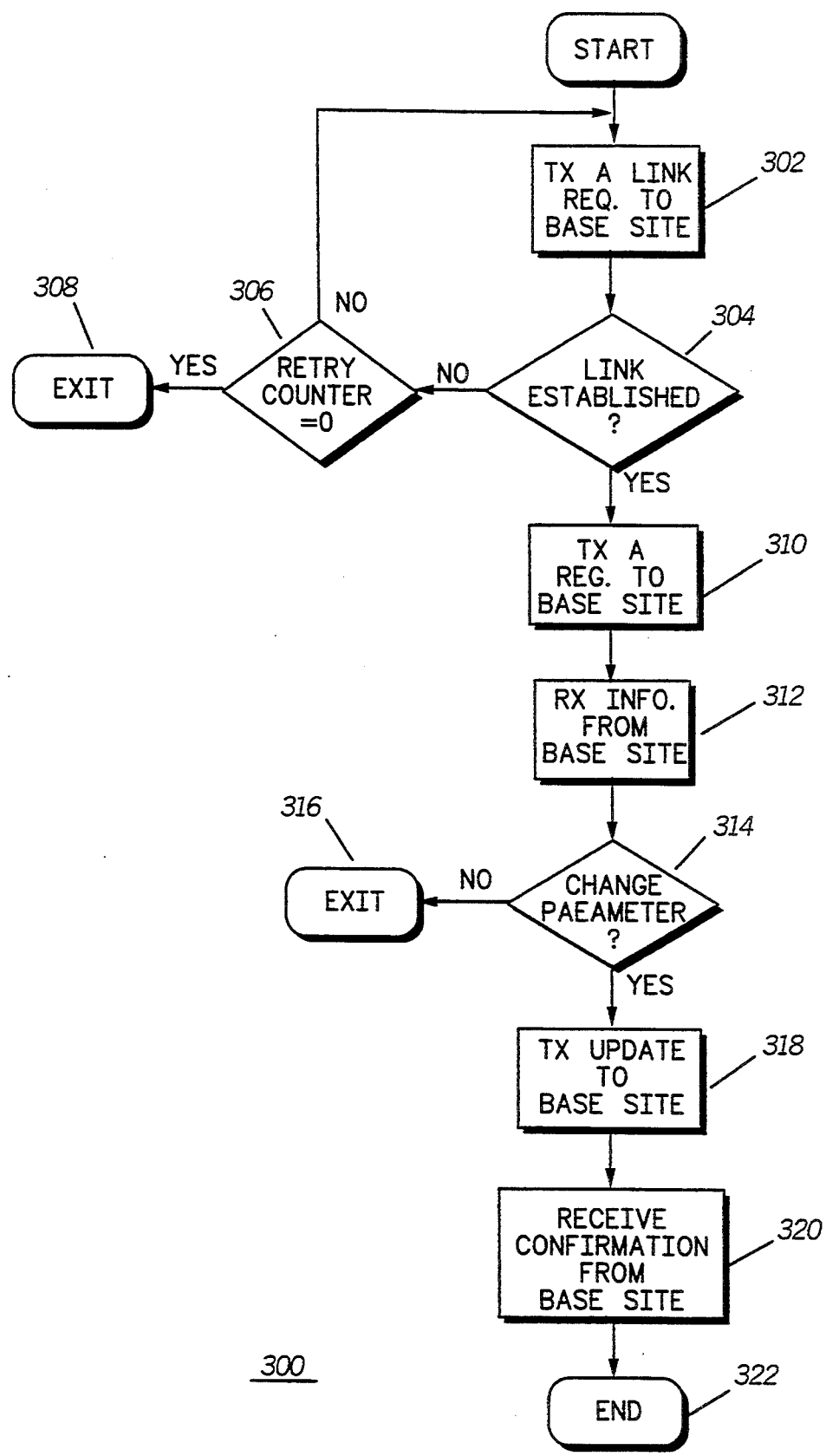
FIG. 3 is a flow diagram of a typical operating sequence in accordance with the present invention.

In FIG. 3, a flow diagram showing the operation of the invention is shown. In step 302, a field engineer transmits a link request in system 100. In decision step 304, it is determined if a link has been established. If no link has been established, in decision step 306, it is then determined if the retry counter =0. If the retry counter does not equal zero, a retransmission of the link request is sent out by handset 120. If in decision step 306, the retry counter does equal zero, the sequence is exited in step 308. Typically, a failed transmission annunciation at handset 120 is sent (tone, flashing LED, etc.) if a communication link can not be established with base site 102.

Once the communication link between handset 120 and a base site (assume site 102 for discussion purposes) has been established, the handset user transmits a message requesting specific data from base site 102 in step 310. For example, the table below shows a few of the available requests as previously discussed:

TABLE 1

| REQUEST | KEY SEQUENCE |
| --- | --- |
| 1. Base ID number. | 1. Function key, #, 1 |
| 2. RSS level of initial link establishment transmission. | 2. Function key, #, 2 |
| 3. RSS level of present transmission. | 3. Function key, #, 3 |
| 4. Present RSS threshold stored at base site. | 4. Function key, #, 4 |
| 5. Change RSS threshold at the base site. | 5. Function key, #, 5, digit #1 and digit #2. |

Once the RSS levels (or other transmission parameters) at different coverage locations have been communicated back to the handset 120, the field engineer can then determine the minimum receive signal strength threshold level to set at base site 102. This can be done via handset 120 as shown in request number 5, of Table 1. For example, to change the minimum signal strength threshold at the base site the field engineer can press the "Function key, # key, the number 6 key and the number 5 key" in order to change the RSS level threshold value to −65dBm. The minimum signal strength threshold level that can be modified from communication unit 120 does not have to be the threshold level that is used by base site 200 for all transmissions from communication units 120 but could be the signal strength threshold level used for original channel link requests. The receive signal strength level could be dynamically modified by an algorithm stored ill controller 208 depending on operating conditions.

Although the operating parameter that has been discussed so far has been related to the received signal strength of the transmission message from handset 120 to base 102 (as measured by base 102), other parameters related to the transmitted message can also be modified with the present invention. For example, the bit error rate threshold of the received message acceptable to base site 102 before discontinuing a link could also be modified with the present invention. Other parameters related to the transmitted message which is received at base 102 can include, carrier to noise ratio of the received signal threshold, SINAD level threshold level, deviation level threshold, etc.

For added security the present invention can require a security sequence. (password) to be entered into the handset 120 prior to allowing the handset to request information or modify any of the operating parameters found at the base sites (102 or 104). This can be a simple key sequence that can be decoded at the handset 120 itself or one that can require verification by the base sites (102 or 104). For more sophisticated security, the password can be stored at the base sites (102 and 104) and thereby can be made modifiable by the network controller 112.

As described above, a base site and method have been provided that ensures quick and easy calibration of a base site over the prior art. By utilizing a conventional handset, a field engineer can go out in the field and remotely calibrate the operating parameters of the base site.

What is claimed is:

1. In a communication system having a communication unit, a remotely calibrated base site comprising:
receiver means for receiving a message from the communication unit;
   measurement means for measuring a transmission parameter related to the received message;
   transmitter means for transmitting the measured transmission parameter back to the communication unit;
   controller means coupled to the receiver means for adjusting a receiver means operating parameter at the base site in response to the receiver means receiving a command to adjust the receiver means operating parameter from the communication unit; and wherein the transmission parameter represents a received signal strength of the received message and the receiver means operating parameter of the base site represents a minimum signal strength threshold level.

2. A method for calibrating a base site having a receiver operating parameter, comprising the steps of:
   (a) receiving a message from a communication unit at the base site, the message requesting a transmission parameter related to the received message;
   (b) measuring the message in order to determine the transmission parameter; and
   (c) transmitting a response message back to the communication unit supplying the requested transmission parameter;
   (d) receiving a command from the communication unit requesting to update the receiver operating parameter; and
   (e) updating the receiver operating parameter in response to the command; and 3. A method for remotely calibrating a base site that is part of a communication system from a communication unit, the base site having a receiver operating parameter, comprising the steps off
   (a) transmitting a message from the communication unit to the base site requesting a transmission parameter from the base site that is related to the transmitted message;
   (b) receiving the message at the base site and measuring the message in order to determine the transmission parameter;
   (c) transmitting a response message from the base site to the communication device supplying the requested transmission parameter;
   (d) receiving the response message at the communication unit;
   (e) transmitting a command from the communication unit to the base site for updating the stored operating parameter;
   (f) updating the receiver operating parameter at the base site as soon as the command is received at the base site; and
   wherein the transmission parameter represents the received signal strength (RSS) Of the message transmitted by the communication unit as measured by the base site and the receiver operating parameter stored in the base site represents a minimum received signal strength threshold level.

4. The method of claim 3, wherein step (f) can only be performed if step (f) has been enabled by a network controller which is part of the communication system.

5. The method of claim 3, wherein step (a) can only be performed after successfully performing a security sequence from the communication device.

* * * * *

UNITED STATES PATENT AND TRADEMARK OFFICE
CERTIFICATE OF CORRECTION

PATENT NO. : 5,428,821
DATED : June 27, 1995
INVENTOR(S) : Krishna et al.

It is certified that error appears in the above-indentified patent and that said Letters Patent is hereby corrected as shown below:

Col. 2, line 24, please delete "and".

Col. 2, line 30, please delete "and".

Col. 2, line 32, after "and" please insert --wherein the receiver operating parameter stored in the base site represents a minimum received signal strength threshold level--.

Col. 3, line 36, please replace "off" with --of:--.

Col. 3, line 56, please replace "Of" with --of--.

Signed and Sealed this

Second Day of April, 1996

BRUCE LEHMAN

*Attest:*

*Attesting Officer*  *Commissioner of Patents and Trademarks*